UNITED STATES PATENT OFFICE.

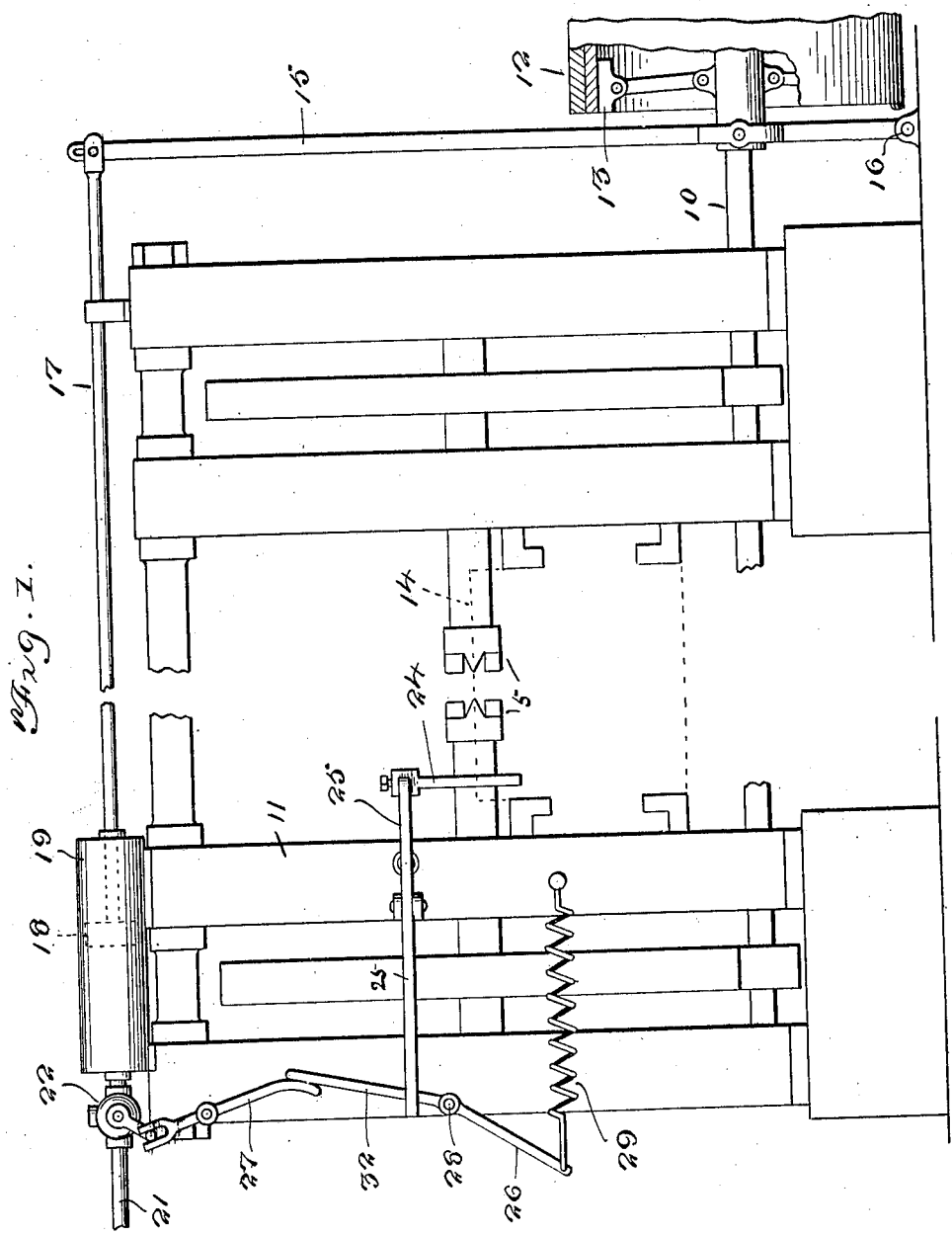

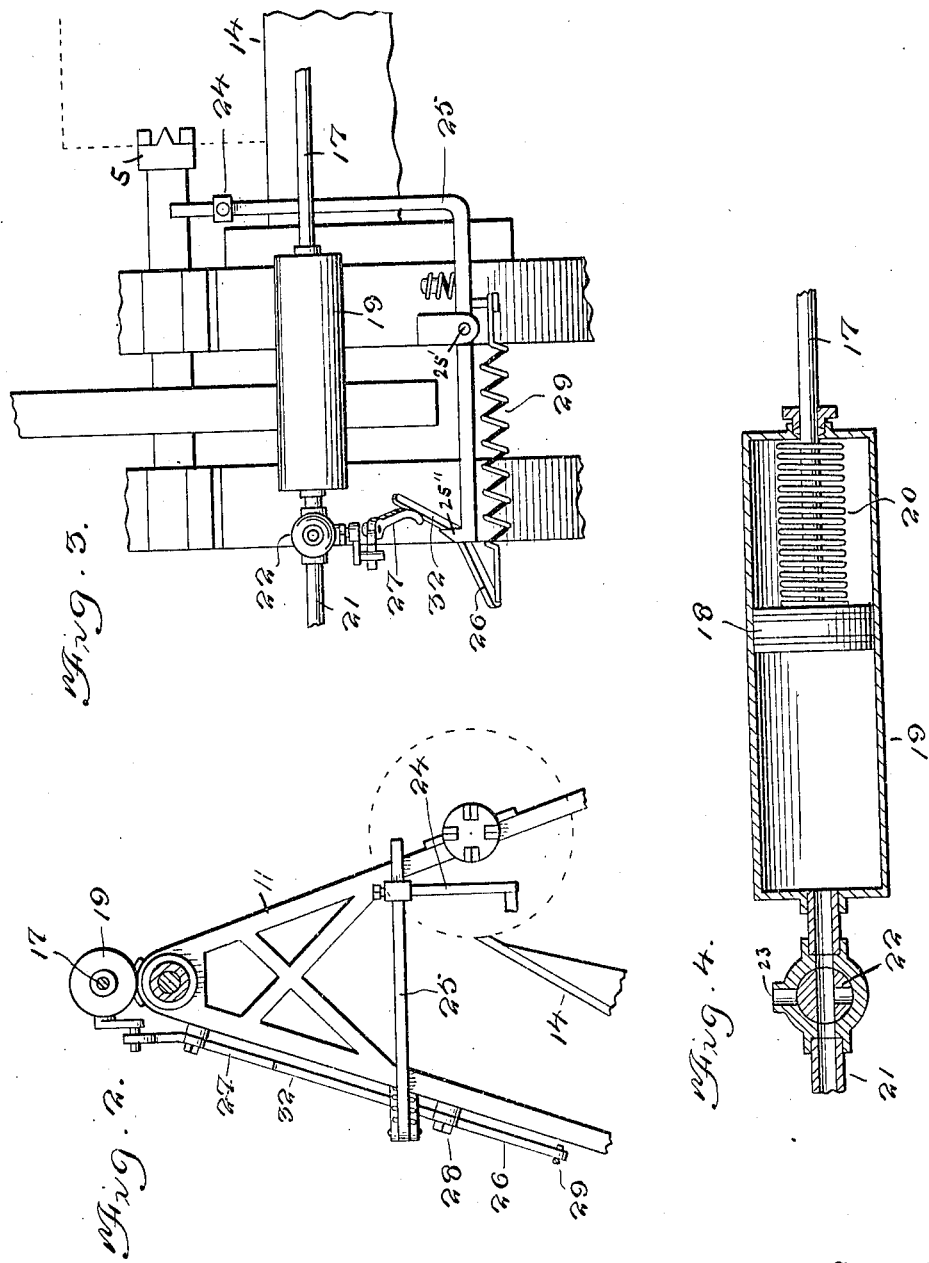

HOMER C. TREVILLION, OF PRESCOTT, ARKANSAS.

AUTOMATIC CLUTCH FOR VENEER-CUTTING MACHINES.

1,298,604.  Specification of Letters Patent.  Patented Mar. 25, 1919.

Application filed November 22, 1918. Serial No. 263,714.

*To all whom it may concern:*

Be it known that I, HOMER C. TREVILLION, a citizen of the United States, residing at Prescott, in the county of Nevada and State of Arkansas, have invented new and useful Improvements in Automatic Clutches for Veneer-Cutting Machines, of which the following is a specification.

This invention relates to an automatic clutch for veneer cutting machines, and the object is to provide means for controlling an ordinary clutch mechanism for starting and stopping the machine, said means being actuated, when throwing in the clutch, by steam pressure, and serving to automatically release the clutch when the steam is cut off, and when the stock being cut has been reduced to a core of a given size.

A further object is to provide, in a device of the type indicated, means under control of the cutting blade for actuating a valve, cutting off the steam supply, and permitting the plunger to move in the opposite direction from that in which it moved under steam pressure, and throw out the clutch.

With the foregoing and other objects in view, the invention consists in the novel construction, combination, and arrangement of elements hereinafter described and claimed.

In the drawings, Figure 1 is a view in side elevation; Fig. 2 is an end elevation; Fig. 3 is a detail in top plan; Fig. 4 is a section through the cylinder, the plunger of which, acting under steam pressure, throws in the main clutch.

In the drawings I have shown more or less conventionally certain of the principal elements of a rotary veneer cutter, the main driving shaft being designated 10, the frame 11, a clutch between the shaft and the driving pulley being shown at 13, and the cutting blade at 14. Chucks 5 serve the usual purpose.

The clutch is under the control of a lever 15 pivoted at 16, and having connection by means of a rod 17 with a plunger 18 operating within a cylinder 19. The spring 20 in expanding tends to force the plunger toward the left in Figs. 1 and 4 for throwing out the clutch. When throwing in the clutch, steam is admitted to cylinder 19 through a pipe 21 having a valve 22 therein, this valve, of the three way type, being opened manually and closed in the manner described below.

The knife bar 14 engages the shoe 24 when the cutting blade reaches a given position—that is, when the stock has been reduced to a core of a given size. Upon the engagement of the shoe by the blade, an element 25 is actuated to free the angle member 26 and operate valve lever 27 stopping the flow of steam to the cylinder.

Element 25 is of the angle arm type and is pivoted at 25'; angle member 26 is pivoted at 28 and the lower end is connected with tension spring 29.

The disengagement of the hook 25'' from arm 32 of the angle lever, under the action of the spring, serves to cut off the supply of steam, allowing the plunger to act under the influence of spring 20 and throw out the clutch. A blow-off port is shown at 23.

In attaching this device to different makes of machines, changes in construction may be made within the scope of the appended claims.

What is claimed is:

1. In a device of the class described, driving means, stock holding means rotated thereby, a cutting blade, a clutch connected with the driving means, and means automatically actuated when the cutting blade reaches a predetermined position, for actuating the clutch.

2. In a device of the class described, driving means, stock holding means rotated thereby, a cutting blade, a clutch connected with the driving means, and means automatically actuated by the cutting blade when the latter reaches a predetermined position, for actuating the clutch, said means last mentioned including a shoe projecting into the path of movement of the blade toward the stock.

In testimony whereof I affix my signature.

HOMER C. TREVILLION.

Copies of this patent may be obtained for five cents each, by addressing the "Commissioner of Patents, Washington, D. C."